United States Patent
Franaszek et al.

(10) Patent No.: US 7,716,424 B2
(45) Date of Patent: May 11, 2010

(54) VICTIM PREFETCHING IN A CACHE HIERARCHY

(75) Inventors: Peter A. Franaszek, Mount Kisco, NY (US); Steven R. Kunkel, Rochester, MN (US); Luis Alfonso Lastras Montaño, Cortlandt Manor, NY (US); Aaron C. Sawdey, Cannon Falls, MN (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 10/989,997

(22) Filed: Nov. 16, 2004

(65) Prior Publication Data

US 2006/0106991 A1 May 18, 2006

(51) Int. Cl.
   *G06F 12/08* (2006.01)
(52) U.S. Cl. .................. 711/137; 711/122; 711/133
(58) Field of Classification Search ............... 711/137, 711/133, 122
   See application file for complete search history.

(56) References Cited

U.S. PATENT DOCUMENTS

| | | | |
|---|---|---|---|
| 4,807,110 A * | 2/1989 | Pomerene et al. ........... 711/213 |
| 4,980,823 A | 12/1990 | Liu | |
| 5,551,000 A | 8/1996 | Tan et al. | |
| 5,845,101 A | 12/1998 | Johnson et al. | |
| 6,038,645 A * | 3/2000 | Nanda et al. ............... 711/141 |
| 6,134,643 A | 10/2000 | Kedem et al. | |
| 6,427,188 B1 * | 7/2002 | Lyon et al. ................... 711/122 |
| 6,535,961 B2 | 3/2003 | Wilkerson et al. | |
| 6,560,693 B1 | 5/2003 | Puzak et al. | |
| 6,678,795 B1 | 1/2004 | Moreno et al. | |
| 6,853,643 B1 * | 2/2005 | Hann et al. ................. 370/413 |
| 2001/0037432 A1 * | 11/2001 | Hotta et al. ................. 711/129 |
| 2002/0138700 A1 | 9/2002 | Holmberg | |
| 2003/0208659 A1 | 11/2003 | Matsubara et al. | |
| 2003/0221072 A1 | 11/2003 | Azevedo et al. | |
| 2004/0015683 A1 | 1/2004 | Emma et al. | |
| 2004/0199740 A1 * | 10/2004 | Makela et al. ............... 711/170 |

OTHER PUBLICATIONS

P.A. Franasek, et al., Adaptive Variation of the Transfer Unit in a Storage Hierarchy, IBM J. 22, No. 4, Jul. 1978, pp. 405-412.
T. Alexander, et al., Distributed Prefetch-Buffer/Cache Design for High Performance Memory SY. pp. 254-263.
H. Yu, et al., DRAM-Page Based Prediction and Prefetching, 2000 IEEE, pp. 267-275.

* cited by examiner

*Primary Examiner*—Tuan V Thai
*Assistant Examiner*—Jae U Yu
(74) *Attorney, Agent, or Firm*—F. Chau & Associates, LLC

(57) ABSTRACT

We present a "directory extension" (hereinafter "DX") to aid in prefetching between proximate levels in a cache hierarchy. The DX may maintain (1) a list of pages which contains recently ejected lines from a given level in the cache hierarchy, and (2) for each page in this list, the identity of a set of ejected lines, provided these lines are prefetchable from, for example, the next level of the cache hierarchy. Given a cache fault to a line within a page in this list, other lines from this page may then be prefetched without the substantial overhead to directory lookup which would otherwise be required.

18 Claims, 4 Drawing Sheets

VICTIM PREFETCHING IN A CACHE HIERARCHY

GOVERNMENT RIGHTS STATEMENT

This invention was made under Government support under Contract No.: NBCH3039004 awarded by DARPA. The Government has certain rights in this invention.

BACKGROUND OF THE INVENTION

1. Field of the Invention

The present invention relates to computer storage management, and, more particularly, to victim prefetching in a cache hierarchy.

2. Description of the Related Art

Memory latency in modern computers is not decreasing at a rate commensurate with increasing processor speeds. This results in the computing device idly waiting for the system to fetch processes from the memory, thereby not fully taking advantage of the faster processor speeds.

Approaches to mitigating memory latency include multithreading and prefetching. The term "multithreading" refers to the ability of a processor to execute two programs almost simultaneously. This permits the processing of one program or "thread" while the other is waiting for data to be fetched. The term "prefetching," as used herein, traditionally refers to retrieving data expected to be used in the future. Each results in increased complexity, as well as increased off-chip traffic. In the case of multithreading, the increased traffic is due to decreased per thread cache capacity, yielding higher miss rates. Prefetching increases traffic by fetching data which is not referenced before castout. As used herein, the term "castout" refers to the process by which data is removed from the cache to make room for data that is fetched.

A number of approaches to prefetching are described in the prior art and/or are implemented in computer systems. These generally include the fetching of data based on currently observed access behavior such as strides (where accesses are to a series of addresses separated by a fixed increment), or via previously recorded access patterns, or by direct software instructions. Each of these approaches have some advantages. However, they either require increased program complexity (for software instructions), have problems dealing with non-regular access patterns (in the case of, for example, stride-based prefetching), or unnecessary complexity (in the case of, for example, recorded access patterns). Further, these earlier approaches do not utilize information readily available to the processor, namely the identity of recently discarded cache lines coupled with their status and location in the storage hierarchy.

SUMMARY OF THE INVENTION

In one aspect of the present invention, a processor-based system for aiding in prefetching between a first level cache and a second level cache is provided. The system includes a directory extension operatively connected to the first level cache and the second level cache; wherein the directory extension stores an entry, the entry (a) identifying at least one page in the first level cache including at least one line that has been recently ejected, and (b) for each of the at least one page, indicating which of the at least one line is prefetchable from the second level cache.

In another aspect of the present invention, a processor-based system for aiding in the prefetching between a first level cache and a second level cache is provided. The system includes information associated with each line in the second level cache; wherein the information identifies whether the each was referenced in the most recent insertion of the each line into the first level cache.

BRIEF DESCRIPTION OF THE DRAWINGS

The invention may be understood by reference to the following description taken in conjunction with the accompanying drawings, in which like reference numerals identify like elements, and in which.

Figure 1:
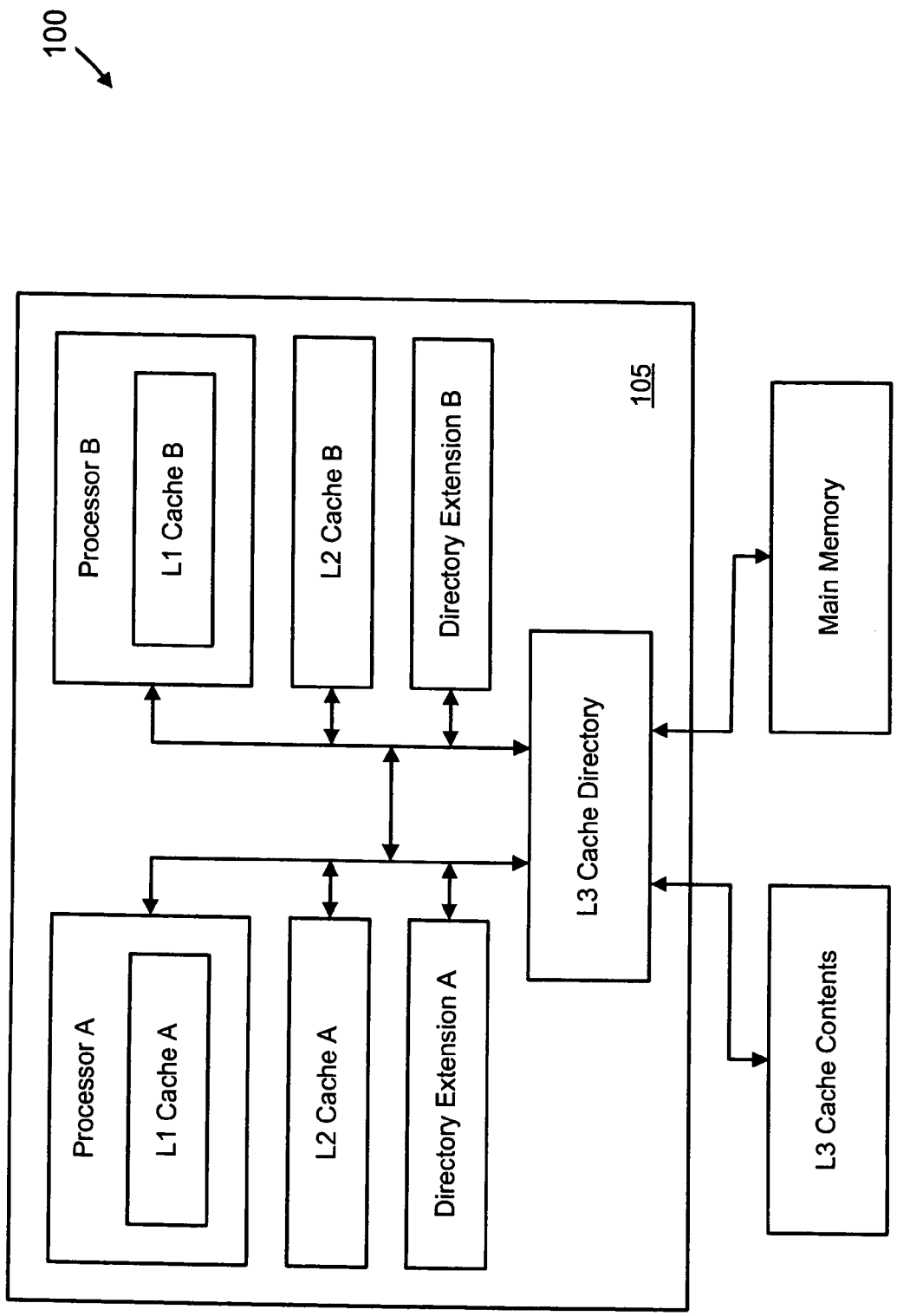
FIG. 1 depicts a block diagram of a processor-based system implementing a directory extension, in accordance with one exemplary embodiment of the present invention.

DETAILED DESCRIPTION OF PREFERRED EMBODIMENTS.

Illustrative embodiments of the invention are described below. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims. It should be understood that the systems and methods described herein may be implemented in various forms of hardware, software, firmware, or a combination thereof.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying FIGS. are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

In the exemplary embodiment of a storage management approach presented herein, a page is 4K bytes, and is divided into lines of 128 bytes. It should be appreciated that the page and lines sizes are presented solely for the sake of simplicity; other configurations may be used as contemplated by those skilled in the art. The unit of storage allocation in the caches is a line. Lines are fetched or discarded from the caches as a function of references by the processors in the system. The storage management approach described herein yields substantial performance gains over prior art approaches with little additional complexity and acceptable levels of traffic.

We present a "directory extension" (hereinafter "DX") to aid in prefetching between proximate levels in a cache or storage hierarchy. A cache hierarchy is a type of storage hierarchy. The DX may maintain (1) a list of pages which contains recently ejected lines from a given level in the cache hierarchy, and (2) for each page in this list, a set of ejected lines, provided these lines are prefetchable from, for example, the next level of the cache hierarchy. Given a cache fault to a line within a page in this list, the DX identifies other lines from this page which are advantageous to prefetch, and which may be prefetched without the substantial overhead to directory lookup which would otherwise be required. As used herein, the term "directory lookup" refers to the process where a cache directory is searched for the presence and status of a line. Such searches are expensive as they are time consuming and tie up the directory mechanism. It should be understood that lines to be prefetched, as identified by the above-described directory extension, could also be identified by additions to the standard directory. In the following, however, we concentrate our description on implementations using the extension.

In an exemplary embodiment of the present invention, we propose a prefetch mechanism that exploits some properties of reference patterns, e.g., that parts of pages accessed together tend to be reaccessed in proximate time. For example, a cache level L(i) may be viewed as a mechanism which stores lines that have been referenced recently. Similarly, the cache at the next level towards memory, typically cache level L(i+1), stores lines referenced somewhat less recently than in cache level L(i). References at cache level L(i) may then suggest that some items from cache level L(i+1) should be prefetched, such as other lines from the same page. Searching the cache directories for items missing from cache level L(i) but held in cache level L(i+1) can impose a substantial load on the cache directories. The structure we consider here alleviates this problem. It also permits the exploitation of other properties related to the desirability of prefetching a line. An example of this we consider here is that of noting which lines prefetched in the recent past were actually referenced.

Although not so limiting, the exemplary embodiment described herein presents the interface between a level two cache (hereinafter "L2") and a level three cache (hereinafter "L3"). As described herein in this exemplary embodiment, the L2 directory and contents, and the L3 directory are on the processor chip; the L3 contents are off-chip. It should be appreciated that other embodiments include the case where a single chip holds multiple processors, each with a private L2.

It should further be appreciated that the DX, as described herein, is distinguishable from a victim cache, which stores recently discarded lines. Rather than holding the discarded cache lines (in this exemplary embodiment, a purpose served by the L3), the DX maintains a record of lines which may be advantageous to prefetch, based on their ejection or victimization. As used herein, the term "ejection" refers to the process where lines are removed from a cache as others are fetched. References which cause a prefetch are referred to herein as "prefetch events" or "PEs." Although not so limiting, the PEs described in the exemplary embodiments below correspond to cache faults. It should be understood that in alternate embodiments, PEs may correspond to more general events, such as references to a given page. As described herein, a line is prefetchable if it is present in L3. It should also be understood that information contained in the DX could be incorporated as part of the cache directories.

Generally, lines that are missing from a given cache level and have recently been referenced are likely to be in the next cache level. For example, lines missing from L2 are likely to be in L3. Thus, although not so limiting, it is desirable in this exemplary embodiment to limit L2 prefetches to lines held in L3, as the expense of mistaken prefetches from lower levels such as main memory may be too high. The prefetch of a line is termed mistaken if the line is not referenced before being ejected.

Given an L2 cache fault to a line in a given page, one can simply fetch all lines from the given page currently in L3 but not L2. One problem with this approach is the load imposed on the cache directories. For example, suppose the page size is 4K, and the line size is 128B. Thus, there are 32 lines in each page. The L3 cache directory is searched for the requested line, and both the L2 and L3 cache directories are searched for the other 31 lines. Performing such a search request can be quite costly for applications where typically only a modest fraction of lines from each page are present in the caches. Thus, servicing such search requests, as well as search requests for additional cache faults, is likely to cause substantial queuing delays for directory lookup. An additional consideration is that L3 directory lookups may be slow. Another problem with this approach is that it provides no way to identify which of the lines from this page are likely to be referenced. The present invention eliminates much of the directory lookup overhead, and provides a good quality of prefetching.

Referring now to FIG. 1, a block diagram of a processor-based system 100 is shown, in accordance with one embodiment of the present invention. The system 100 includes a processor chip 105. Included on the processor chip 105 are two processors: processor A and processor B. Processor A includes a private L1 cache A that is located on the processor A. Processor B includes a private L1 cache B that is located on the processor B. Processor A is associated with its own private L2 cache A, and processor B is associated with its own private L2 cache B. Also included on the processor chip 105 is a L3 cache directory associated with off-chip L3 cache contents. The system 100 further includes a main memory.

The system 100 includes DX-A (i.e., directory extension A) associated with processor A and L2 cache A, and a DX-B (i.e., directory extension B) associated with processor B and L2 cache B. A directory extension may be an n-way set associative cache. Although not so limiting, in the present exemplary embodiment, the DX-A and the DX-B are 8-way set associative caches. Each equivalence class in the DX contains "entries" or tags for the n pages in this equivalence class that have most recently had an ejection of a line, and for each such entry, a victim vector ("VV") described below. As used herein, the term "equivalence class" refers to the set of lines which can be mapped to the eight locations referred to above.

In one embodiment, a VV is a 32 bit vector that holds the identity of lines ejected from the L2 cache (but not necessarily referenced) during a current visit of this entry (as defined above) into the DX, and whether the ejected lines are present in L3. For example, the ith bit in the victim vector is 1 if the ith line in the corresponding page has been ejected from L2, and is present in L3. In a second embodiment, we may modify the VV from the above as a function of what we term a "prefetch score." In the current implementation, the prefetch score is 1 if the line was referenced in the most recent visit to L2, and is zero otherwise. Thus, the ith bit in the VV is 1 if the ith line in the corresponding page has been ejected from L2, is present in L3, and has a prefetch score of, 1. In each of the above examples, the ith bit in the VV is 1 only if the line in question has not been invalidated, or otherwise rendered non-prefetchable by another processor. As noted above, a suboptimal alternative to our preferred embodiment would include the above information in L3 directory entries associated with individual lines. Thus, given an L2 fault, L3 entries for other lines in this page can be scanned and prefetched, if appropriate.

Although the embodiments described above prefetch from the next level in a cache hierarchy, it should be appreciated that the DX can be used for prefetching from other levels, as contemplated by one skilled in the art.

We now described in detail exemplary implementations of a VV in a processor-based system. The processor-based system may be similar to the one illustrated in FIG. 1. The L3 cache (i.e., the directory and contents combined) is a victim cache of the L2 cache. That is, each line that is evicted from the L2 cache is immediately inserted in the L3 cache, assuming the line is not in the L3 cache already. Further, as a line is fetched into the L2 cache from the L3 cache, the line is deleted from the L3 cache. As previously stated, the prefetch events herein are simply cache faults.

Figure 2:
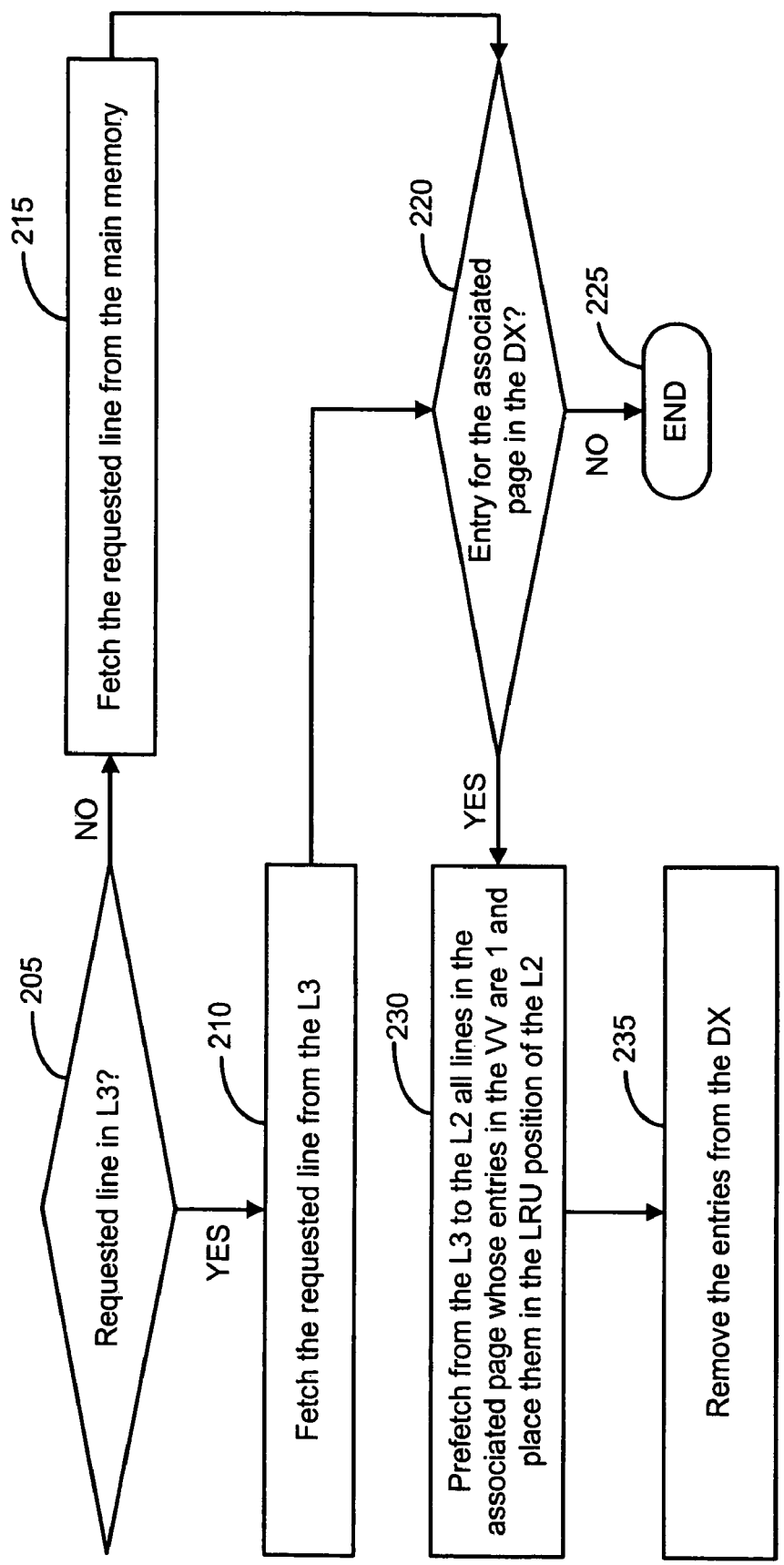
FIG. 2 depicts a flow diagram illustrating an exemplary method applying the directory extension of FIG. 1 on a L2 cache fault, in accordance with one exemplary embodiment of the present invention.

Referring now to FIG. 2, an exemplary method applying a directory extension on a L2 cache fault is illustrated, in accordance with one embodiment of the present invention. It is assumed here that an L2 cache fault has occurred. That is, a requested line for an associated page is not present in the L2 cache. On the L2 cache fault, it is determined (at 205) whether the requested line is present in the L3 cache. If the requested line is present in the L3 cache, then it is fetched (at 210) from the L3 cache. If the requested line is not present in the L3 cache, then it is fetched (at 215) from the main memory. Concurrently, the DX is accessed to determine (at 220) whether it has an entry (e.g., a tag) for the associated page. Concurrency is beneficial as it minimizes delays. If the entry is not found, the method terminates (at 225). If the entry is found, lines with 1s in the VV are prefetched (at 230) into the L2 cache from the L3 cache. The related page tag is removed (at 235) from the DX.

Lines that are prefetched into the L2 cache are placed at an appropriate level within their respective equivalence class. For example, in a cache where entries in an equivalence class are ordered according to how recently they have been used or referenced, in one embodiment, the least recently used ("LRU") position may be chosen.

Figure 3:
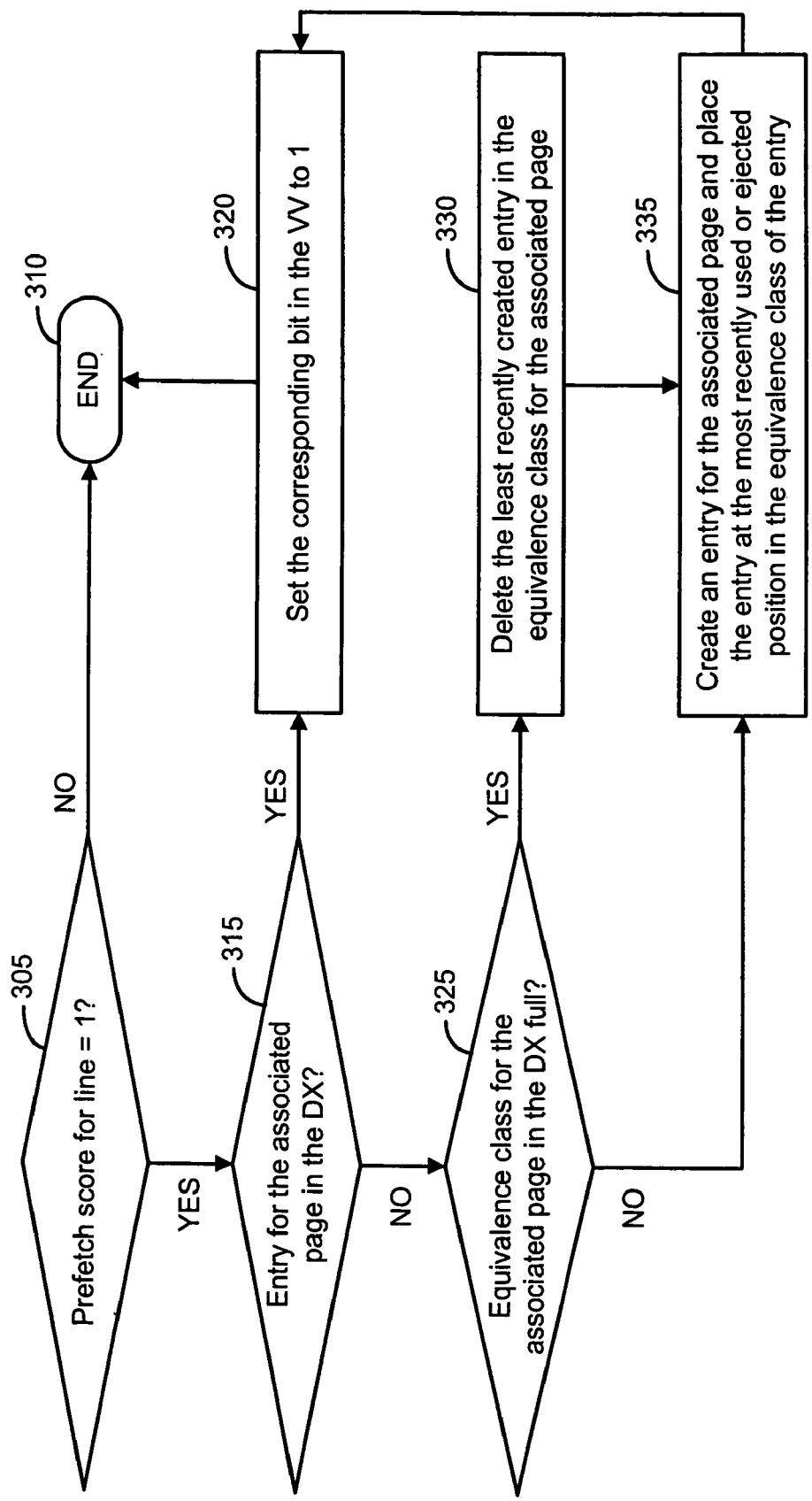
FIG. 3 depicts a flow diagram illustrating an exemplary method applying the directory extension of FIG. 1 on a L2 castout, in accordance with one exemplary embodiment of the present invention.

Referring now to FIG. 3, an exemplary method applying a directory extension on a L2 castout is illustrated, in accordance with one embodiment of the present invention. It is assumed here that a L2 castout has occurred. That is, a line ejected from L2 is written back to L3. The ejected line is included in an associated page. It is determined (at 305) whether a prefetch score for the ejected line is equal to one. If the prefetch score for the ejected line is not equal to one, then the method terminates (at 310). If the prefetch score for the ejected line is equal to one, then it is determined (at 315) whether a VV entry for the associated page is in the DX. If the entry is present in the DX, then the VV entry (e.g., a bit) corresponding to the associated page in the DX is set (at 320) to 1. If the entry is not present in the DX, then is determined (at 325) whether the equivalence class of the associated page in the DX is full. If the equivalence class is full, then the least recently created entry in the equivalence class is deleted (at 330). After either steps 325 or 330, a VV entry is created (at 335) in the DX for the associated page at the most recently used or ejected position in the equivalence class of entry. Following step 335, the VV entry (e.g., a bit) is set (at 320) to 1.

Figure 4:
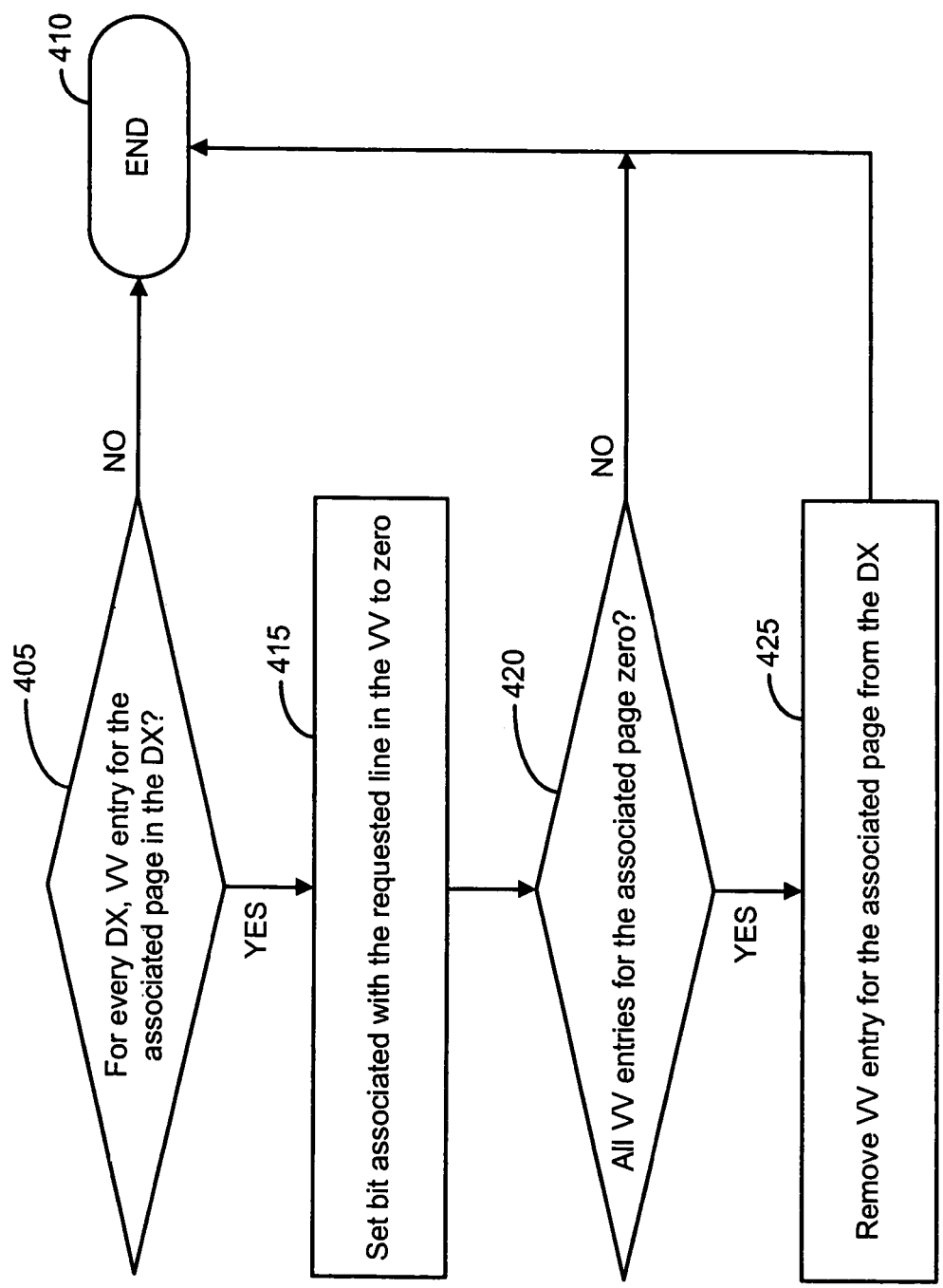
FIG. 4 depicts a flow diagram illustrating an exemplary method applying the directory-extension of FIG. 1 on deletions of a line from the L3 cache or invalidations of the line in the L3 cache, in accordance with one exemplary embodiment of the present invention.

Referring now to FIG. 4, an exemplary method applying a directory extension on deletions of a line from the L3 cache or invalidations of the line in the L3 cache is illustrated, in accordance with one embodiment of the present invention. It is assumed here that a line is unavailable for one of the three following reasons: (1) an L3 castout; (2) the line was fetched by another processor sharing the L3 cache; or (3) invalidation or claim in exclusive mode by another processor. The associated page for this line is the page of which this line is a part. For each DX on the processor chip, it is determined (at 405) whether a VV entry for the associated page is in the DX. If the VV entry for the associated page is not in the DX, then the method terminates (at 410). If the VV entry for the associated page is in the DX, then the VV corresponding to the requested line is updated (e.g., the bit corresponding to the line is set to zero) (at 415). It is determined (at 420) whether all the VV entries for the associated page are zero. If all the VV entries for the associated page are not zero, then the method terminates (at 425). If all the VV entries for the associated page are zero, then the entry for this page is deleted from the DX.

If a line is declared invalid, or claimed exclusive by another processor, the entry for this line in the DX is set to zero. If all the VV entries for the associated page are zero, the entry for this page is deleted from the DX.

It should be appreciated that the L3 cache management is unchanged by prefetching. That is, lines fetched or prefetched into the L2 cache are deleted from the L3 cache. Lines ejected from L2 cache are placed in the most recently used ("MRU") position in their respective equivalence class in L3.

The particular embodiments disclosed above are illustrative only, as the invention may be modified and practiced in different but equivalent manners apparent to those skilled in the art having the benefit of the teachings herein. Furthermore, no limitations are intended to the details of design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A processor-based system for aiding in the prefetching between a first level cache and a second level cache, comprising:
   a first level cache;
   a second level cache;
   a directory extension maintaining a plurality of entries for pages of the first level cache from which a plurality of lines have been ejected, and further maintains for each entry, a vector indicating which of the plurality of ejected lines of a corresponding page are prefetchable from the second level cache; and a prefetch score for each prefetchable ejected line indicating whether the prefetchable ejected line was referenced in a most recent access of the first level cache, wherein each prefetchable ejected line referenced in a most recent read-only access of the first level cache is assigned the prefetch score 1 and assigned the prefetch score 0 otherwise, wherein each page includes a plurality of lines, and wherein if the recently ejected line is ejected from the first level cache in a castout, the prefetch score indicates that the ejected line was referenced in the most recent read-only access of the first level cache, and the directory extension excludes the entry and a new entry is created in the directory extension for the associated page in a level within an equivalence class of the ejected line.

2. The processor based system of claim 1, wherein a bit of the vector corresponding to the ejected line is 1 when the prefetch score is 1 and the ejected line is present in the second level cache, and the bit is 0 otherwise.

3. The processor-based system of claim 1, wherein the ejected lines for a page are ejected before an insertion of another entry into the directory extension for the same page.

4. The processor-based system of claim 1, wherein the second level cache is a level higher than the first level cache.

5. The processor-based system of claim 1, wherein the first level cache is a level 2 cache and the second level cache is a level 3 cache.

6. The processor-based system of claim 1, wherein the second level cache is a victim cache of the first level cache.

7. The processor-based system of claim 1, wherein each cache line ejected from the first level cache is inserted in the second level cache, and wherein each line fetched into the first level cache from the second level cache is deleted from the second level cache.

8. The processor-based system of claim 1, wherein the new entry is set to indicate that the recently ejected line is prefetchable from the second level cache.

9. The processor-based system of claim 1, wherein if the equivalence class of the directory extension is full prior to creating the new entry, then a last recently created entry of the equivalence class is deleted.

10. The processor-based system of claim 1, wherein if a cache fault occurs in the first level cache for a requested line for an associated page, and when the directory extension includes the entry for the associated page indicating that an ejected line is prefetchable from the second level cache, then the ejected-line is prefetched into the first level cache from the second level cache.

11. The processor-based system of claim 10, wherein the ejected line prefetched into the first level cache is placed at an appropriate level within an equivalence class.

12. The processor-based system of claim 11, wherein the equivalence class specifies that the ejected line is placed in the first level cache according to a least-recently-used ordering.

13. The processor-based system of claim 1, wherein if an unavailable line of an associated page is unavailable in the second level cache, and if the directory extension includes the entry for the associated page, then the entry is updated to indicate that the unavailable line is unavailable to be prefetched from the second level cache.

14. The processor-based system of claim 13, wherein if the entry indicates that no line from the associated page is prefetchable from the second level cache, then the entry is deleted.

15. The processor-based system of claim 13, wherein the unavailable line is unavailable when (i) the line is castout by the second level cache, (ii) the line is fetched by another processor sharing the second level cache, (iii) the line is invalidated by another processor, or (iv) there is a claim of exclusivity for the line by another processor.

16. The processor-based system of claim 1, wherein the directory extension is stored on a processor chip.

17. A processor-based system for aiding in the prefetching between a first level cache and a second level cache, comprising:

a first processor;
a first level cache;
a second level cache; and
a directory extension (DX) maintaining a plurality of entries for pages of the first level cache from which a plurality of lines have been ejected, wherein the DX further maintains within in each entry:

a vector indicating which of the plurality of ejected lines of a corresponding page are prefetchable from the second level cache and referenced in a most recent access of the first level cache; and a prefetch score for each prefetchable ejected line indicating whether the prefetchable ejected line was referenced by the first processor in the most recent access of the first level cache, wherein each prefetchable ejected line was referenced in the most recent access when the prefetch score is a first value and was not referenced in the most recent access when the prefetch score is a second value different from the first value, wherein each page includes a plurality of lines, and wherein if a second processor other than the first processor makes an exclusive claim to each of the plurality of ejected lines of the corresponding page, the entry associated with the corresponding page is deleted from the DX.

18. A method of managing an ejection of a line from a cache using a directory extension and a prefetch score, the method comprising:

determining whether a prefetch score for an ejected line is equal to 1 indicating that the line was referenced by a first processor in a most recent access to a first level cache;

upon determining that the prefetch score is 1, determining whether a vector for a page corresponding to the ejected line is in a directory extension;

upon determining that the vector is present in the directory extension and an absence of an exclusive claim to the ejected line by a second processor other than the first processor, setting the vector to 1 to indicate that the line is prefetchable from a second level cache, was referenced in the most recent access to the first level cache, and has not been claimed exclusively by the second processor;

upon determining that the vector is not present in the directory extension, determining whether an equivalence class of the page in the directory extension is full;

upon determining that the equivalence class of the page in the directory extension is full, deleting a least recently created vector in the equivalence class; and creating a vector in the directory extension for the page at an ejected position in the equivalence class.

\* \* \* \* \*